United States Patent
Shen et al.

(10) Patent No.: US 6,463,043 B1
(45) Date of Patent: Oct. 8, 2002

(54) CARRIER PHASE RECOVERY OF MULTI-RATE SIGNALS

(75) Inventors: Qiang Shen, Nepean (CA); Peter Savinsky, Voronezh (RU); Rui Wang; Wen Tong, both of Ottawa (CA); Dmitry Menyailov, Voronezh (RU); Dmitry Pogorilko, Voronezh (RU); Alexander Garmonov, Voronezh (RU)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/200,080

(22) Filed: Nov. 25, 1998

(51) Int. Cl.$^7$ .................................................. H03D 1/00
(52) U.S. Cl. ........................ 370/320; 370/335; 375/326; 375/340
(58) Field of Search ................................ 370/320, 335, 370/342, 441; 375/316, 324, 325, 326, 229, 232, 233, 262, 340, 341; 455/132, 136, 137, 138, 139, 140

(56) References Cited

U.S. PATENT DOCUMENTS 5,987,076 A * 11/1999 Zehavi et al. ............... 370/320

OTHER PUBLICATIONS

Tomiuk et al, Maximal Ratio Combining with Channel Estimation Errors, IEEE, pp. 363–366, 1995.*

Nicoloso, an Investigation of Carrier Recovery Techniques for PSK Modulated Signals in CDMA and Multipath Mobile Envirnoment, Thesis, Virginia Polytechnic Institute and State University, pp. 1–161, Jun. 1997.*

* cited by examiner

Primary Examiner—Kwang Bin Yao
Assistant Examiner—Frank Duong
(74) Attorney, Agent, or Firm—Gibbons, Del Deo, Dolan, Griffinger & Vecchione

(57) ABSTRACT

Methods and apparatus for performing complex channel gain estimation from a transformer output and a non-coherent combiner output include a selector, an envelope detector, a weighting unit, a controller, store units, and an averager. The device may perform coherent complex channel gain estimation on link signals for signals transmitted by IS-95 burst randomization, and may operate on a power control group.

12 Claims, 7 Drawing Sheets

| Averager | $\Sigma_1$ | $\Sigma_2$ | $\Sigma_3$ | $\Sigma_4$ |
|---|---|---|---|---|
| Summed maximal Walsh symbol values $B_i$ (i=1,2,3,4,5,6) | $B_1\ B_2\ B_3$ | $B_1\ B_2\ B_3\ B_4\ B_5$ | $B_2\ B_3\ B_4\ B_5\ B_6$ | $B_4\ B_5\ B_6$ |
| Walsh symbols to use in the corresponding averager | 1,2 | 3 | 4 | 5,6 |

FIGURE 5

CARRIER PHASE RECOVERY OF MULTI-RATE SIGNALS

FIELD OF THE INVENTION

This invention relates generally to the field of wireless communications systems and, more particularly, to apparatus and methods for recovering carrier phase of multi-rate signals.

BACKGROUND OF THE INVENTION

In typical wireless communication systems a Cell Site Modem (CSM) is used for communication between the base station and the mobile station. Among other things, the CSM recovers the carrier phase of the link signal from the mobile to base station. Carrier phase recovery (sometimes referred to as phase referencing) is the operation of extracting a phase coherent reference carrier from a received carrier.

The base station transmits a pilot channel as a reference channel. This allows the mobile station to acquire the timing of the forward channel and thus provides a phase reference for the mobile station. However, the IS-95 standard does not provide for the mobile station transmitting a reference channel to the base station. Therefore the base station must use the link signal to estimate the carrier phase.

Generally, CSMs use non-coherent demodulation. The drawback of this method is the signal to noise ratio degradation at each demodulator. In addition, non-coherent demodulation prevents rake receivers from using more sophisticated combining methods to achieve higher combining gain for a multipath fading channel.

Coherent demodulation provides a better signal to noise ratio than non-coherent techniques. However, it is difficult to recover carrier phase when the link signal is the only signal to work from. Carrier recovery used for coherent demodulation is complicated further by the fact that IS-95 uses a data burst randomizer to transmit multi-rate data.

When the signal received by the base station is at the full rate, conventional systems and methods of carrier recovery for coherent demodulation may be employed. However, when the signal received by the base station is a series of random bursts, each burst having the length of one power control group (i.e. 6 Walsh symbols in IS-95), conventional CSMs do not effectively estimate carrier phase for use in coherent demodulation. This is because conventional CSMs do not perform complex (i.e. magnitude and phase) channel gain estimation on a single power control group. Thus, sufficient gains are difficult to achieve for the different data rates.

Others have attempted to recover carrier phase from the mobile to base station link signal using phase locked loop systems. However these systems do not provide adequate carrier phase. Phase locked loop systems require continuous signal input and cannot operate at lower transmission rates when signals become intermittent. While more gain may be achieved for full rate transmissions, losses can occur for other lower transmission rates. Systems which utilize tentative non-coherent demodulation and moving average complex estimation also require continuous signal input and experience similar problems at lower rate transmissions.

Other proposals which utilize aided symbol or aided signal technologies require modification of IS-95 standard devices and methods. These proposals would be incompatible with the existing wireless communication infrastructure.

Accordingly there exists a need for systems and methods of performing coherent complex channel gain estimation on link signals which is effective for signals transmitted by IS-95 burst randomization.

There also exists a need for such systems which operate on a power control group.

Accordingly it is an object of the present invention to provide systems and methods for performing coherent complex channel gain estimation on link signals which is effective for signals transmitted by IS-95 burst randomization.

It is also an object of the present invention to provide systems and methods which operate on a power control group.

SUMMARY OF THE INVENTION

In accordance with the teachings of the present invention, these and other objects may be accomplished by the present invention, which is a system for performing complex channel gain estimation from a transformer output and a non-coherent combiner output. A selector determines an orthogonal function index from the non-coherent combiner output, and may use the orthogonal function index to determine a corresponding complex value from the transformer output.

An envelope detector may calculate the squared magnitude of the transformer output and generate M-ary real values, where M is an integer greater than one. A weighting unit coupled to the envelope detector may estimate a signal quality coefficient from the M-ary real values and generating weighted symbols by multiplying the signal quality coefficient by the corresponding complex value.

Store units may be coupled to the weighting unit for storing the weighted symbol. Also, an averager may be coupled to the store units for averaging the weighted symbols. A controller may be coupled to the non-coherent combiner output, the store units, and the averager, for resetting the store units and for controlling the averager, thereby determining complex channel gain estimation.

Another embodiment of the present invention is a system for performing carrier phase recovery of multi-rate signals which include in-phase and quadrature phase portions. An embodiment of the present invention includes a despreader capable of despreading at least one code from the multi-rate signals. The despreader is also capable of despreading the inphase and quadrature phase signals of the multi-rate signals.

This embodiment also includes a transformer which is coupled to the despreader. The transformer is capable of transforming the in-phase and quadrature phase signals and obtaining a plurality of M-ary complex values, where M is an integer greater than one.

A buffer, non-coherent combiner, and estimator are coupled to the transformer. The buffer is capable of storing the plurality of M-ary complex values. The non-coherent combiner is capable of combining the non-coherent portions of the plurality of M-ary complex values. The estimator is both coupled to the transformer and the non-coherent combiner. The estimator is configured to estimate a complex channel gain from the plurality of M-ary complex values and the non-coherent combining of the plurality of M-ary complex values of all fingers (branches).

In addition a coherent combiner is coupled to the buffer and the estimator. The coherent combiner is configured to perform maximal ratio combining of the stored plurality of M-ary complex values and the channel complex gain estimation. The output of the coherent combiner is a plurality of real value vectors.

BRIEF DESCRIPTION OF THE DRAWINGS

The invention will be more clearly understood by reference to the following detailed description of an exemplary embodiment in conjunction with the accompanying drawings, in which:

FIG. 5 is a table showing an example of the contents used in the complex gain estimator.

DETAILED DESCRIPTION OF THE INVENTION

The conventional technology of code division multiple access (CDMA) employs a technique that allows users to simultaneously share the same radio frequency band. It achieves this by modulating the radio frequency signal with a spreading sequence known as a pseudonoise (PN-code) digital signal. Other pseudo-random sequences (i.e. codes) can be mixed to the signals to make them more resistant to noise, multi-path propagation, fading, and time jitter. For example a code that reduces the effect of multi-path propagation, time jitter (imprecise implementation errors) is an orthogonal code. In the preferred embodiment, a Walsh coded orthogonal spectrum is received. However, other types of orthogonal codes are well known. Thus, the Walsh codes can be supplemented by other orthogonal codes and still be within the scope of the present invention.

Figure 1:
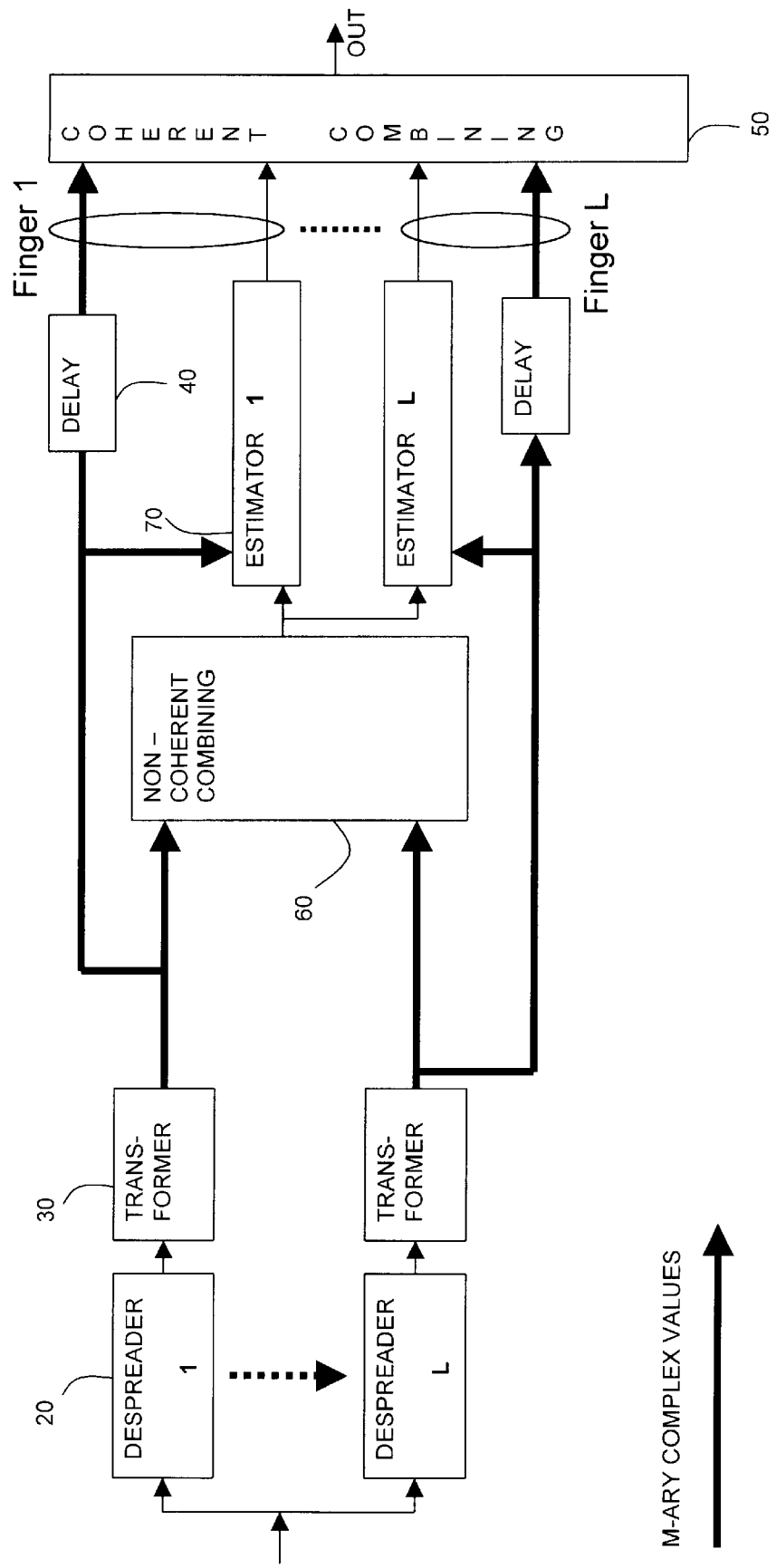
FIG. 1 is a general block diagram of a coherent, maximal-ratio combining System in accordance with the present invention.

In accordance with the present invention, a system decorrelates the unique codes mixed with the carrier signals. In addition, the system can use the link signal to estimate the carrier phase. FIG. 1 illustrates a system in accordance with the present invention for using the recovered carrier phase of multi-rate signals. The apparatus shown may be used at a wireless network base station, mobile station, or any other wireless communication station such as a communication satellite.

The received signals, which include in-phase (I) and quadrature (Q) components, are applied to the inputs of a despreader 20. The despreader 20 decorrelates the PN-code from the received signals. The output of the despreader is the orthogonal (i.e. Walsh) codes in complex form.

A transformer 30 is coupled to the output of the despreader 20. The transformer 30 operates on the I and Q phase components of the orthogonal signals using a Fast Hadamard Transform (a type of Discrete Fourier Transform). Those skilled in the art will appreciate that other known transforms may be used instead of the Fast Hadamard Transform, such as Fast Walsh Transform, Fast Rademacher Transform, Fast Hartley Transform and the like, and still be within the scope of the invention. The output of the transformer is the complex orthogonal spectrum with M-ary complex values, where M is an integer (e.g. 64).

A delay unit 40 is also coupled to the transformer 30. The delay unit 40 stores the orthogonal spectrums (within one power control group) from the transformer 30 for further processing after the channel complex gain estimation is available. A complex gain estimator 70 determines the channel complex gain estimation from the output values of each finger output (i.e. the output of the transformer 30 and noncoherent combiner 60). Once the complex estimation is ready, the delay 40 feeds the stored data to a coherent combiner 50 with the corresponding complex gain estimate. For example, the delay 40 unit may store the complex signal for up to a 6 Walsh symbol duration. The 6 Walsh symbol spectrum in one power control group can use the same one estimate or use several estimates, depending on the implementation.

A noncoherent combiner 60 is also coupled to the output of the transformer 30. The noncoherent combiner 60 performs diversity combining to all branches of the orthogonal spectrum with noncoherent output. One method of obtaining diversity combining of noncoherent values is to use equal gain combining. However other methods for performing noncoherent diversity combining can be used and still be within the scope of the invention.

Figure 1B:
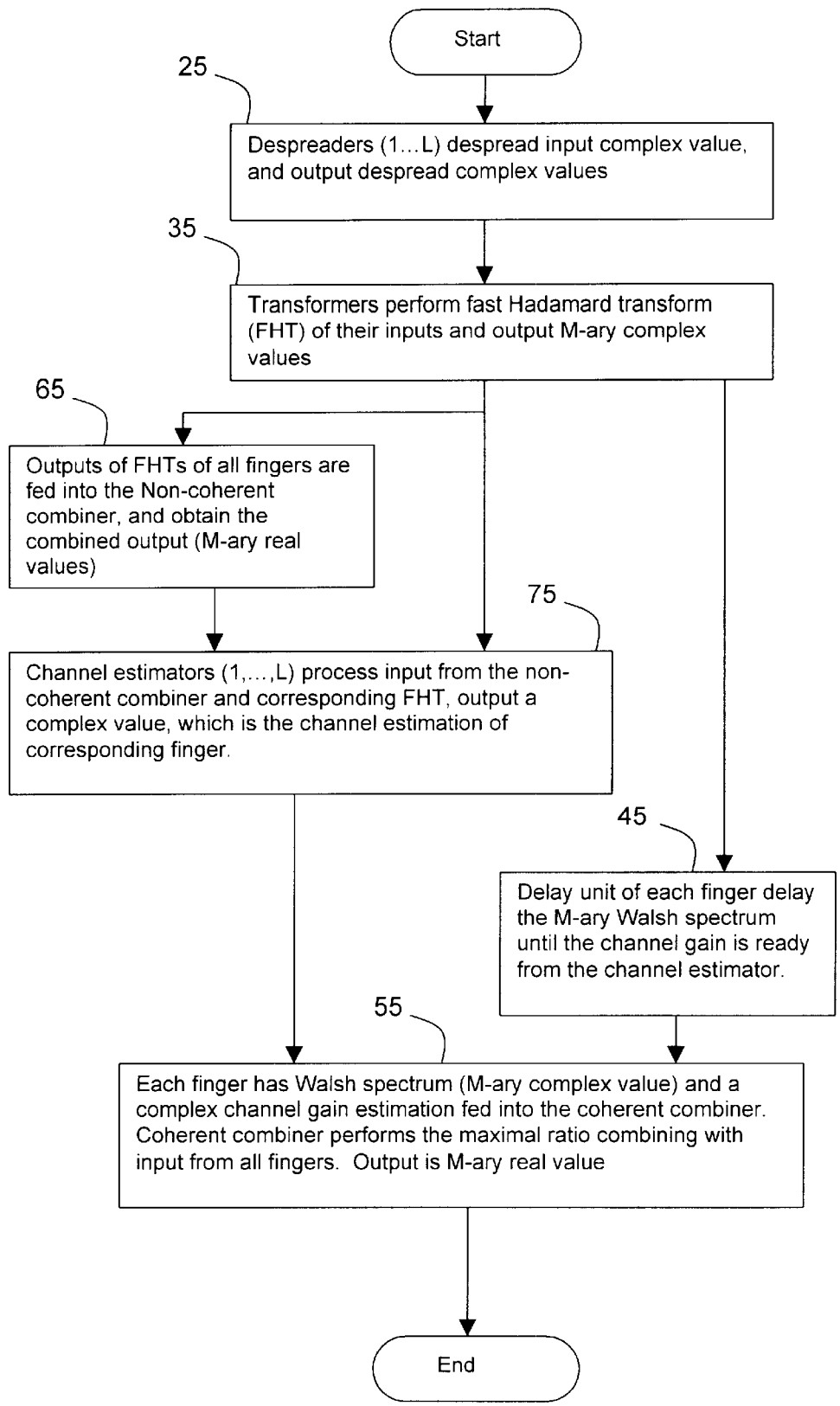
FIG. 1B is a flowchart diagram illustrating the operation of the system in accordance with the present invention.

The coherent combiner 50 is coupled to the delay 40 and the complex gain estimator 70. The coherent combiner 50 performs diversity combining to all branches with coherent output. This can be accomplished by performing maximal ratio combining on all branches with complex gain weights. Maximal ratio combining is accomplished by multiplying the complex conjugate of the complex gain estimate to the corresponding finger output and then combining all the fingers. The coherent combiner output is the real value vector of M (e.g. M=64) elements for M-ary orthogonal modulation. FIG. 1B is a flowchart diagram illustrating the operation of the coherent, maximal ratio combining system and further illustrates the signal flow and processing of the complex value input in accordance with the present invention.

Figure 2:
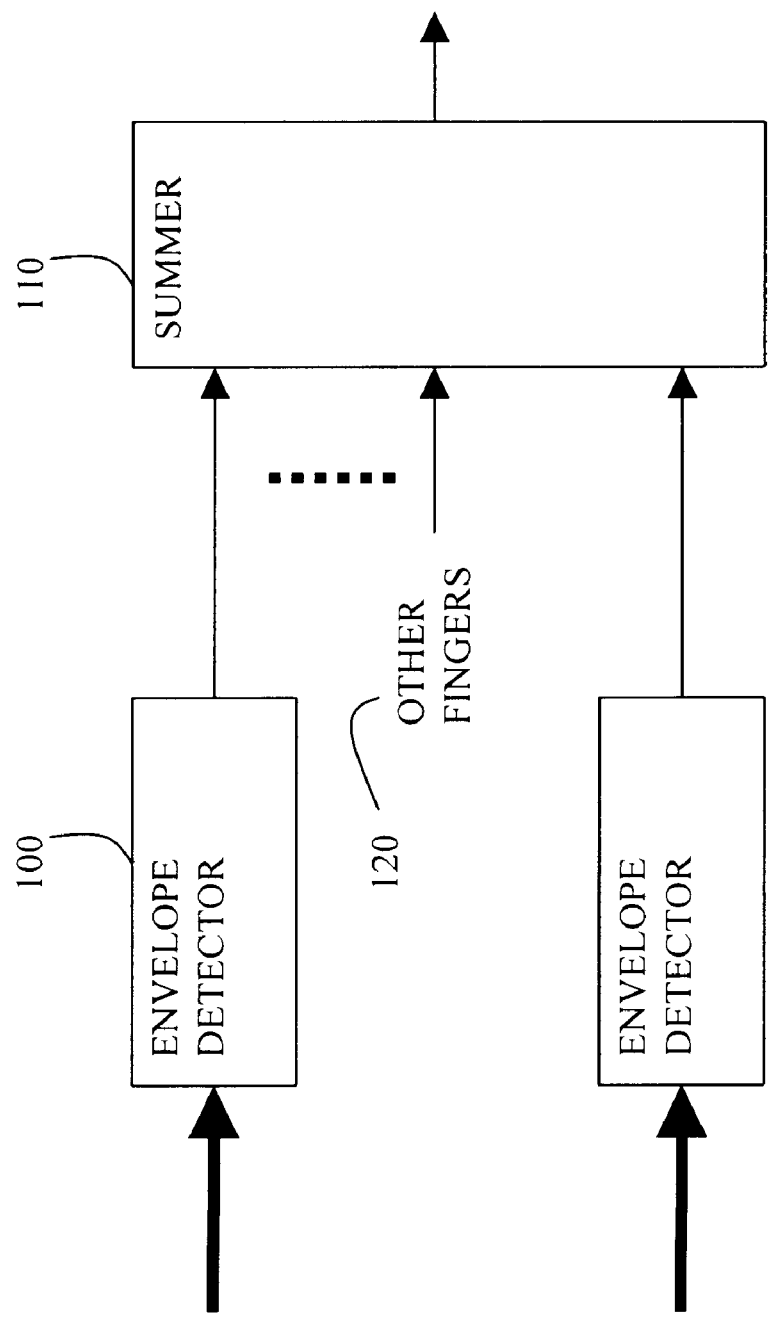
FIG. 2 is a diagram of the non-coherent combiner.

FIG. 2 is a detailed diagram of the noncoherent combiner 60. The envelope detector 100 performs on each finger output M-ary complex value, which is the output of the transformer 30. A summer 110 sums the M-ary complex values of each finger from each envelope detector 100 and returns a M-ary real value by computing the square of the magnitude of each complex value. Other fingers 120 may also be coupled to the summer 110. The output is thus the diversity combining of all the branches of the orthogonal spectrum with noncoherent output.

Figure 3:
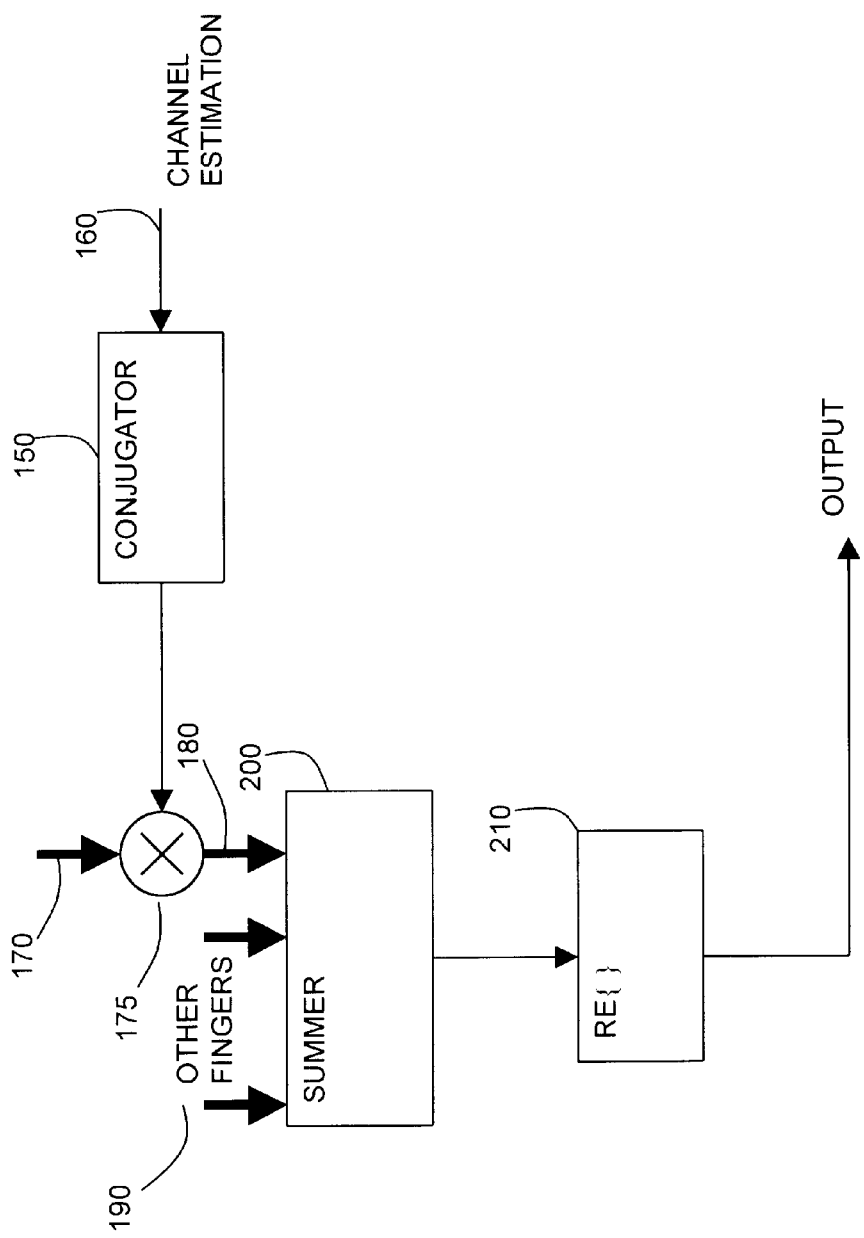
FIG. 3 is a diagram of the coherent combiner.

FIG. 3 is a detailed diagram of the coherent combiner 50. A conjugator 150 returns the complex conjugate of the channel estimation 160 coming from the estimator 70. The complex conjugate is then multiplied with the delayed orthogonal spectrums 170 by a multiplier 175, where the delayed orthogonal spectrum comes from the delay 40. The multiplied output 180 is then summed by a summer 200. Other fingers 190 may also be summed together. The real part of the complex value from the summer 200 is then obtained using a real value unit 210. The output is the diversity combination of all the branches of the orthogonal spectrum with coherent output.

Figure 4A:
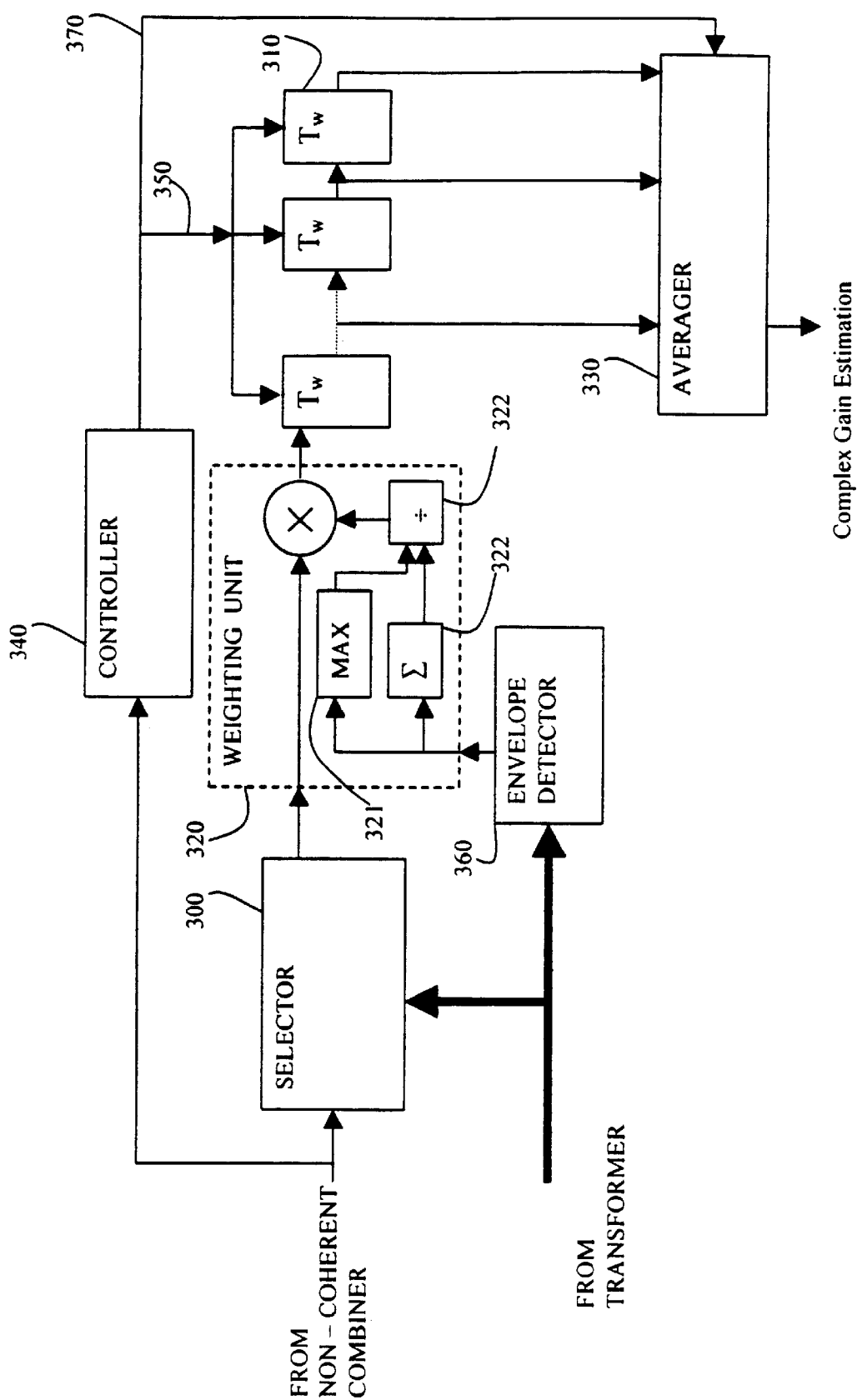
FIG. 4A is a diagram of the channel complex gain estimator.

FIG. 4 is a detailed description of the complex gain estimator. A selector 300 takes the noncoherent combiner 60 output and the transformer 30 output of the corresponding finger and determines the orthogonal function index. This index is corresponding to the maximum value of the orthogonal spectrum received from the non-coherent combiner 60, and is used to select a corresponding complex value from the transformer 30 output. The output of the selector 300 is the complex value corresponding to that orthogonal function index in the transformer 30 output. The index may be a Walsh index, Gold index, Rademacher index, Hartley index, or the like and still be within the scope of the invention. The corresponding element in the transformer 30 output is fed into a store unit 310 after being weighted by a weighting unit 320.

Figure 4B:
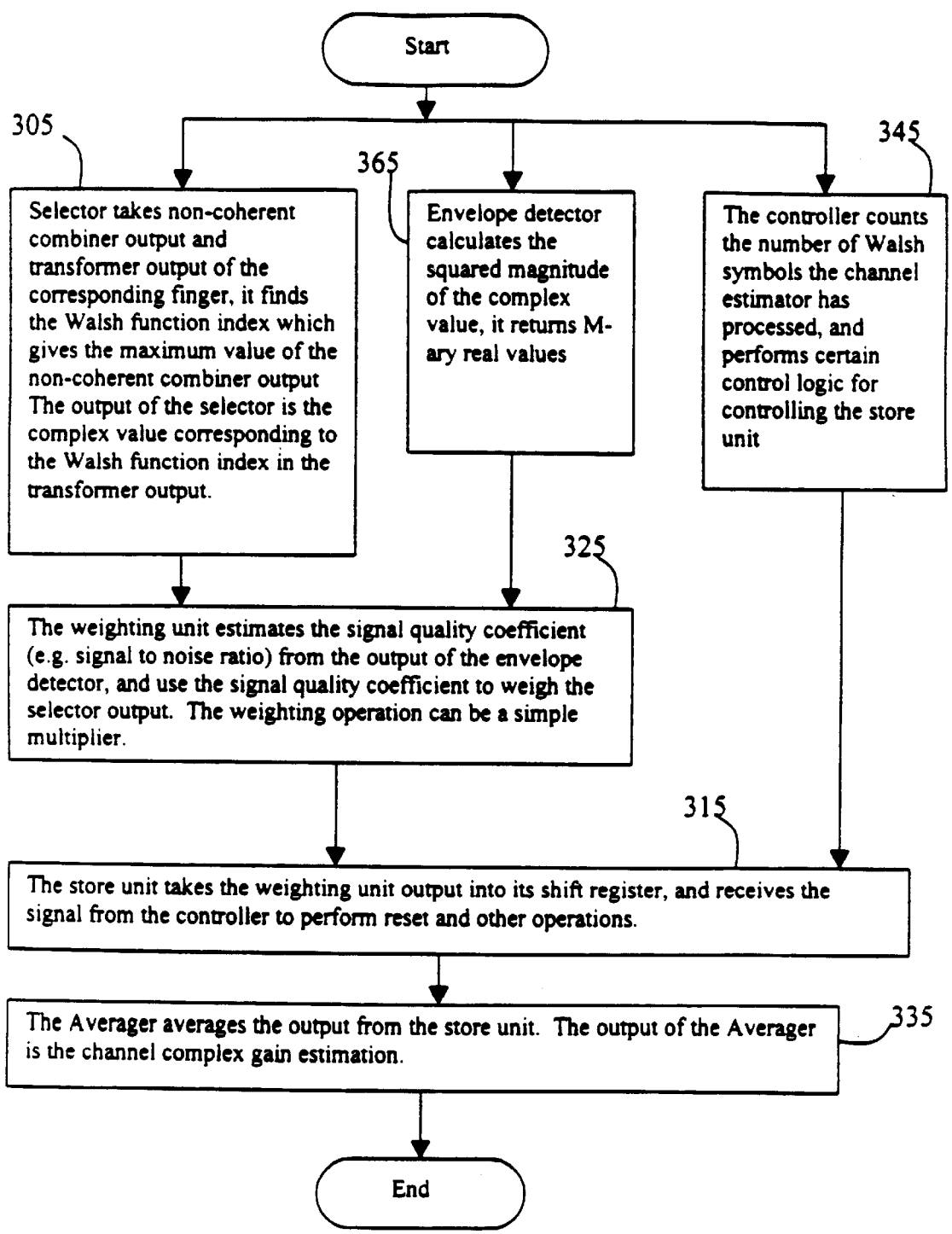
FIG. 4B is a flowchart diagram illustrating the operation of the channel complex gain estimator in accordance with the present invention.

An envelope detector 360 calculates the squared magnitude of the complex value from the transformer 30 and returns M-ary real values, where M is an integer (e.g. 64). The weighting unit 320 estimates the signal quality (e.g. signal to noise ratio) from the output of the envelope detector 360 and uses this estimation (in the form of weighting coefficients) to weigh the selector 300 output. The weighting unit 320 can be a simple multiplier. It may optionally be omitted, thus creating a weighting factor of one. Those skilled in the art will realize that various noise quality coefficients may be determined from a signal. The preferred embodiment uses a signal to noise ratio coefficient determined by dividing 323 the average 322 and maximum value 321 of the output from the envelope detector The store unit 310 may be a shift register with a tapped delay line, or other memory device, with a size of N, where N is the number of symbols in one power control group. For example, if Walsh symbols are used N may be equal to 6. However since other types of symbols can be used and still be within the scope of this invention and other symbols have different size power control groups, N may be any integer. The symbols may be Walsh symbols, Gold symbols, Rademacher symbols, Hartley symbols, or the like and still be within the scope of the invention. These complex values are then selectively fed into an averager 330 according to certain control logic from a controller 340. The controller 340 unit counts the symbol index, and at the end of every N symbols (i.e. one power control group), resets the contents of the store unit (i.e. resets the memory or shift register). It also controls which elements of the store unit 310 are used in the channel gain estimation according to the index the system is operating on. FIG. 4B is a flowchart diagram illustrating the operation of the channel estimator and further describes the signal flow through the channel estimator in accordance with the present invention.

The averager 330 averages the contents of the store unit 310. The controller 340 decides which contents the averager 330 will use in the averaging. For example, four summing operators perform averaging over different sets of Walsh symbol values as shown in FIG. 5.

In the table shown in FIG. 5, $B_1$ (i=1,2, . . . 6) are the contents in the store unit 310. They are selectively used in the averager according to each Walsh symbol the channel estimation is for. Note that there are N=6 Walsh symbols in one power control group according to the IS-95 standard. Optionally, the control signal 370 to the averager 330 can be omitted, which means all N(=6) Walsh symbols in one power control group use one channel gain estimation which is the average of all N contents from the store unit 310. Those skilled in the art will realize that a more sophisticated weighted summation (filtering) can be used in place of the simple averager 330 shown. Also, tap adaptation (i.e. adjusting the poles and/or zeros) of such filtering may also be utilized.

What is claimed is:

1. An estimator for determining a complex channel gain estimation from a transformer output and a non-coherent combiner output, comprising:

a selector for determining an orthogonal function index from said non-coherent combiner output, and determining a corresponding complex value from said transformer output using said orthogonal function index, an envelope detector for calculating the squared magnitude of said transformer output, and for generating at least one M-ary real value, wherein M is an integer greater than one, a weighting unit coupled to said envelope detector for estimating a signal quality coefficient from said at least one M-ary real value and generating at least one weighted symbol by multiplying said signal quality coefficient by said corresponding complex value, at least one store unit coupled to said weighting unit for storing said at least one weighted symbol, an averager coupled to said at least one store unit for averaging said at least one weighted symbol, and a controller coupled to said non-coherent combiner output, said at least one store unit, and said averager, for resetting said at least one store unit and for controlling said averager, thereby determining said complex channel gain estimation.

2. An estimator according to claim 1, wherein said controller resets said at least one store unit after said non-coherent combiner output is at least one control group.

3. An estimator according to claim 1, wherein said weighting unit is a multiplier for multiplying said at least one M-ary real value and said corresponding complex value.

4. An estimator according to claim 1, wherein said averager selectively combines said at least one weighted symbol from said at least one store unit, according to a signal of said controller.

5. An method for determining a complex channel gain estimation from a transformer output and a non-coherent combiner output, comprising:

determining an orthogonal function index from said non-coherent combiner output, and determining a corresponding complex value from said transformer output using said orthogonal function index, calculating the squared magnitude of said transformer output, and for generating at least one M-ary real value, wherein M is an integer greater than one, estimating a signal quality coefficient from said at least one M-ary real value and generating at least one weighted symbol by multiplying said signal quality coefficient by said corresponding complex value, storing said at least one weighted symbol, averaging said at least one weighted symbol, and controlling said averager, thereby determining said complex channel gain estimation.

6. A method according to claim 5, wherein said controlling further comprises resetting said at least one store unit after said non-coherent combiner output is at least one control group.

7. A method according to claim 5, wherein said weighted symbol is derived by multiplying said at least one M-ary real value and said corresponding complex value.

8. A method according to claim 5, further comprising controlling said averaging by selectively combining said stored at least one weighted symbol.

9. An apparatus for determining a complex channel gain estimation from a transformer output and a non-coherent combiner output, comprising:

a selector means for determining an orthogonal function index from said non-coherent combiner output, and determining a corresponding complex value from said transformer output using said orthogonal function index, an envelope detector means for calculating the squared magnitude of said transformer output, and for generating at least one M-ary real value, wherein M is an integer greater than one, a weighting unit means coupled to said envelope detector means for estimating a signal quality coefficient from said at least one M-ary real value and generating at least one weighted symbol by multiplying said signal quality coefficient by said corresponding complex value, at least one store unit means coupled to said weighting unit means for storing said at least one weighted symbol, an averager means coupled to said at least one store unit means for averaging said at least one weighted symbol, and a controller means coupled to said non-coherent combiner output, said at least one store unit means, and said averager means, for resetting said at least one store unit means and for controlling said averager means, thereby determining said complex channel gain estimation.

10. An apparatus according to claim 9, wherein said controller means resets said at least one store unit after said non-coherent combiner output is at least one control group.

11. An apparatus according to claim 9, wherein said weighting unit means is a multiplier means for multiplying said at least one M-ary real value and said corresponding complex value.

12. An apparatus according to claim 9, wherein said averager means selectively combines said at least one weighted symbol from said at least one store unit means, according to a signal of said controller means.

* * * * *